Patented Jan. 20, 1931

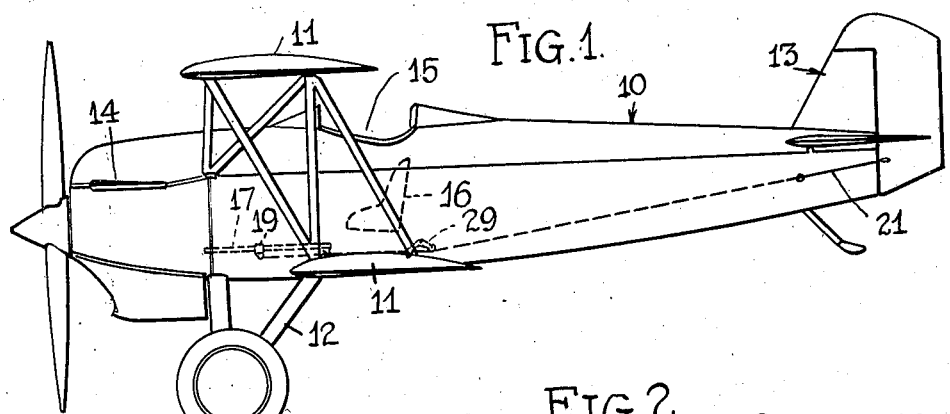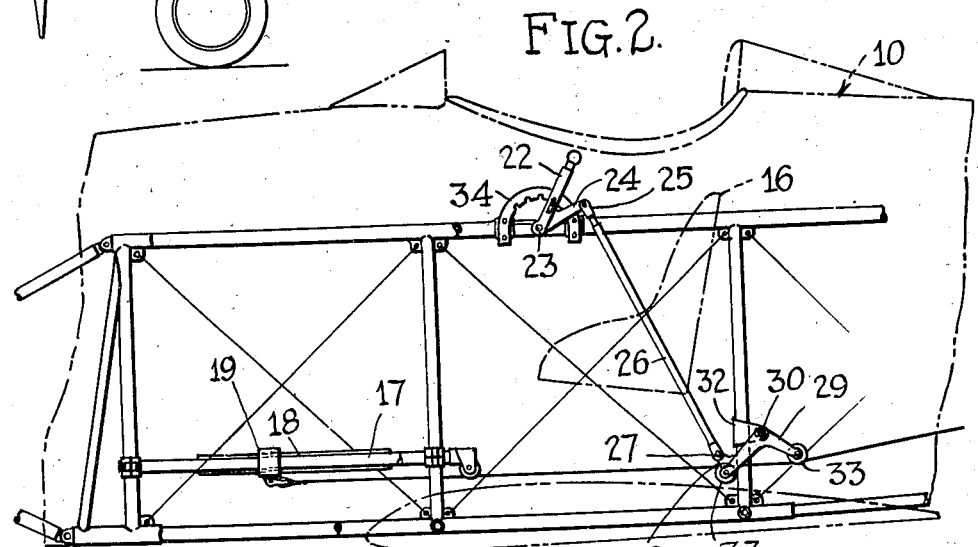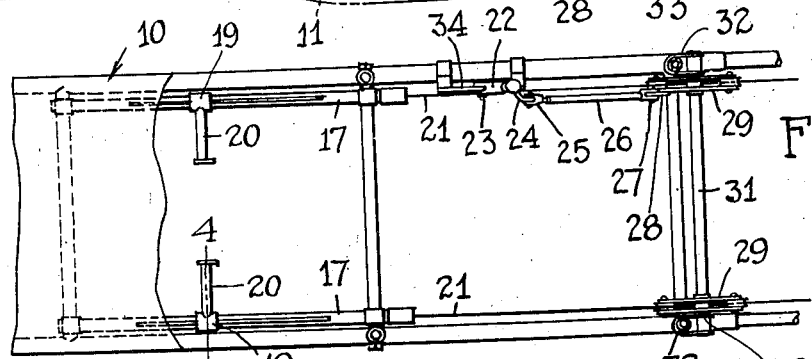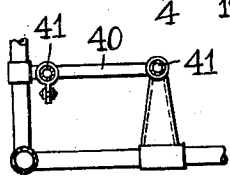

1,789,483

UNITED STATES PATENT OFFICE

WILLIAM WAIT, JR., OF GARDEN CITY, NEW YORK, ASSIGNOR TO CURTISS AEROPLANE & MOTOR CO., INC., A CORPORATION OF NEW YORK

OPERATING MECHANISM FOR AIRCRAFT CONTROL SURFACES

Application filed December 23, 1926. Serial No. 156,592.

My invention relates to operating mechanism for an aircraft control surface.

An object of the invention is to provide a control surface operating mechanism in which the control device or devices, instead of being pivotally hung or pivotally supported, as heretofore, is or are movable bodily, back and forth, along a suitable guide or along suitable guides (as the case may be) enclosed within and extending longitudinally of the aircraft fuselage or body.

A further object of the invention is to provide a control surface operating mechanism in which the control device or devices is or are bodily adjustable toward and away from the pilot's seat; such adjustment being obtained by merely sliding said control device or devices along said guide or guides.

A further and equally important object of the invention is to provide a control surface operating mechanism in which provision is made for eliminating all slack in the connection or connections between said control device or devices and said control surface or surfaces.

A still further object of the invention is to so organize said slack adjustment means as to admit of its use also as a means for adjusting said control device or devices; the adjustments, in each instance, being directly proportional one to the other and obtained simultaneously.

Other objects and advantages of the invention will be hereinafter set forth.

In the drawings, wherein like reference characters denote like or corresponding parts, Fig. 1 is a side elevation of a conventional type aeroplane having the control surface operating mechanism of the present invention installed therein;

Fig. 2 is a side elevation of the control surface operating mechanism showing clearly the construction and general arrangement of the parts comprising such mechanism;

Fig. 3 is a plan view of the structure illustrated in Fig. 2;

Fig. 4 is an enlarged section on the line 4—4 of Fig. 3, and

Fig. 5 is a detail sectional view of a slight modification.

While the invention, as herein disclosed, may be used on or in connection with any and all types of aircraft, the embodiment selected for illustration discloses a more or less conventional type aeroplane. Among other parts, said aeroplane comprises the usual fuselage or body 10, supporting surfaces 11—11, landing gear 12, empennage 13 and power plant 14, the latter, for the major part, being completely enclosed within the nose or forward portion of the aeroplane fuselage or body. Said fuselage or body has formed therein, intermediately of its ends, a cockpit 15 within which is mounted a seat 16 for the pilot. At a point in advance of the seat 16, suitable guides 17—17 are provided. These guides 17—17 extend parallel, are completely enclosed within the fuselage or body, and preferably extend from one to another of the vertical fuselage struts. Each said rod, throughout a substantial portion of its length, is provided with suitable keys 18—18 over which the head portions 19 of the control devices (one for each rod) slide. To accommodate the keys 18—18, the head portion 19 of each control device has formed therein suitable key-ways which, by the fitting engagement of the keys therein, hold said control devices substantially horizontal or in that position most satisfactory for the proper manipulation thereof.

The control devices or pedals 20, of which there are two, one at each side of the fuselage, are free to slide back and forth along said rod guides 17—17. By means of suitable control connections 21—21 the pedals 20 are connected to one of the control surfaces of the machine, i. e., the rudder surface as herein disclosed. Thus connected the opposite back and forth sliding movement of said control devices 20 will cause said rudder surface to swing either to the right or left, as the case may be.

To provide for the fore and aft adjustment of said control devices and to simultaneously take up all slack from the connections 21—21, an operating lever 22 is provided within and at one side of the fuselage or body 10 in convenient proximity to the seat 16. Said lever 22 is pivoted as at 23 and has extending off therefrom, as illustrated in Fig. 2, an arm 24. This arm 24 is pivotally fastened as at 25 to a rod 26 which is fastened as at 27 at its opposite end to an ear 28 formed on the forward arm of one of two bell cranks 29 positioned, one at each side of the machine. Each bell crank 29 is pivoted as at 30 to rock in a substantially vertical plane in response to the manipulations of the lever 22. As illustrated in Fig. 3, the two bell cranks 29 are interconnected by means of a cross-rod 31 journaled in bearings 32 carried by certain of the vertical fuselage struts of the body. Thus connected, said bell cranks 29 are adapted to move simultaneously and to the same extent at all times.

Each bell crank 29 at the outer end of its respective arms, carries an idler or pulley 33 over which the connections 21 extend. By extending said connection over the upper edge of the forward pulley 33 and over the under edge of the rear pulley 33, said connection, as the pulleys are simultaneously moved in opposite directions, is either taken up or let out as the case may be. In Fig. 2 of the drawings, where the pedals 20 are shown in their foremost position of adjustment, the connections 21 are extended to their maximum. To adjust said pedals toward the seat 16, it is only necessary to shift the lever 22 forwardly. Thus shifted said bell cranks 29 are rocked simultaneously to simultaneously draw said pedals toward said seat and at the same time vary the effective length of the respective connections. As a means for holding said lever 22 in its adjusted position a quadrant 24 is provided.

In the modification of Fig. 5, instead of providing a single guide rod for each pedal 20, the pedals 40 are mounted to extend between parallel guide rods 41. Thus supported no keys or key-ways are required to be used.

The advantages of a control surface operating mechanism of the character set forth are obvious. Such a control surface lends itself admirably to aeroplane structures in view of its extreme simplicity, ease of operation, and more or less conventional pedal movement; it is further advantageous in that thru the operation of the control lever 22 minute adjustment of the pedals to suit pilot's of different physical characteristics, can be accurately and quickly obtained; and it is moreover, still further advantageous in that regardless of the position of adjustment of the foot pedals all slack in the operating connections between the foot pedals and the control surface is automatically taken up thru one and the same operation as that required in effecting such adjustment.

While I have described my invention in detail in its present preferred embodiment, it will be obvious to those skilled in the art after understanding my invention, that various changes and modifications may be made therein without departing from the spirit or scope thereof. I aim in the appended claims, to cover all such modifications and changes.

What I claim is:

1. Operating mechanism for an aircraft control surface including a control device, a rod along which said control device is freely adjustable for the purpose specified and along which said control device is free to slide, back and forth, in any position of adjustment to operate said control surface, a connection between said control device and said control surface, and means for eliminating all slack in said connection produced by such adjustment.

2. Operating mechanism for an aircraft control surface including a control device bodily adjustable in a fore and aft direction in its relation to said craft, a control connection extending between said control device and said control surface, an operating lever, and means responsive in its movement to the movement of said lever and engaging said connection for adjusting said control device by varying the effective length of said connection.

3. Operating mechanism for an aircraft control surface including a control device bodily adjustable in a fore and aft direction in its relation to said craft, a control connection extending between said control device and said control surface, and means engaging said connection for bodily adjusting said control device without any alteration whatsoever in the actual over-all length of said connection.

4. Operating mechanism for an aircraft control surface including a pair of control devices, each said control device being bodily adjustable in a fore and aft direction in its relation to said craft, a control connection extending from one to the other of said control devices by way of said control surface, and means engaging said connection for simultaneously and similarly adjusting said control devices.

5. Operating mechanism for an aircraft control surface including a pair of control devices, each said control device being bodily adjustable in a fore and aft direction in its relation to said craft, a control connection extending from one to the other of said control devices by way of said control surface, and means operable to simultaneously and similarly adjust said control devices without any alteration whatsoever in the over-all length of said connection.

6. Operating mechanism for an aircraft control surface including a pair of control devices, said control devices being simultaneously oppositely movable in a fore and aft direction to operate said control surface and being simultaneously and similarly bodily adjustable in a fore and aft direction in relation to said craft, a control connection extending from one to the other of said control devices by way of said control surface, and means operable to simultaneously and similarly bodily adjust said control devices without affecting in any way the simultaneous opposite fore and aft movement thereof as aforesaid.

7. Operating mechanism for an aircraft control surface including a pair of control devices, a gride for each said control device along which said control devices are adapted to slide back and forth in opposite directions in the operation of said control surface and along which said control devices are bodily adjustable in a fore and aft direction relatively to said craft, a control connection extending from one to the other of said control devices by way of said control surface, and means operable to bodily adjust said control devices and at the same time automatically vary the effective length of said connection.

8. Mechanism for the control of aircraft comprising a rudder, a pair of foot pedals for operating said rudder, connecting members associated with said rudder and with said foot pedals, a seat for a pilot positioned conveniently relative to said pedals, means for simultaneously adjusting the position of both pedals toward said seat and for allowing the simultaneous movement of both pedals away from said seat while maintaining the rudder stationary and the cables taut and while the pilot maintains a control upon the rudder and upon both of the pedals by pressure of his feet thereon, whereby adjustments may be made safely in the air to adapt the position of the pedals for the use of pilots having legs of various lengths.

9. Mechanism for the control of aircraft comprising a rudder, a pair of foot pedals for operating said rudder, connecting members associated with said rudder and with said foot pedals, a seat for a pilot positioned conveniently relative to said pedals, means for simultaneously adjusting the position of both pedals toward said seat while maintaining the rudder stationary and the cables taut and while the pilot maintains a control upon the rudder and upon both of the pedals by pressure of his feet thereon, whereby adjustments may be safely made in the air to adapt the position of the pedals for the use of pilots having legs of various lengths.

10. Mechanism for the control of aircraft comprising a rudder, a pair of foot pedals for operating said rudder, connecting members associated with said rudder and with said foot pedals, a seat for a pilot positioned conveniently relative to said pedals, means for simultaneously adjusting the position of both pedals in the same direction relative to said seat while maintaining the cables taut and while the pilot maintains a control upon the rudder and upon both of the pedals by the pressure of his feet thereon, whereby adjustments may be safely made in the air to adapt the position of the pedals for the use of pilots having legs of various lengths.

11. Mechanism for the control of aircraft comprising a rudder, means for moving said rudder, a pair of operating members connected to said moving means, a seat for a pilot positioned conveniently relative to said operating members, and means for simultaneously adjusting the position of both operating members in the same direction relative to said seat while the pilot maintains control of the rudder, whereby adjustments may be made safely in the air to adapt the position of the operating members for the use of pilots of different stature.

In testimony whereof I hereunto affix my signature.

WILLIAM WAIT, Jr.